United States Patent
Mohan et al.

(10) Patent No.: US 12,256,287 B2
(45) Date of Patent: Mar. 18, 2025

(54) FLEXIBLE WORKSPACE SYSTEM WITH REAL-TIME SENSOR FEEDBACK FOR MOBILE CHECK-IN

(71) Applicant: Building Robotics, Inc., Oakland, CA (US)

(72) Inventors: Tanuj Mohan, Mountain View, CA (US); Michael Edward Giannikouris, Elora (CA); Colm Nee, Kitchener (CA)

(73) Assignee: Building Robotics, Inc., Santa Clara, CA (US)

( * ) Notice: Subject to any disclaimer, the term of this patent is extended or adjusted under 35 U.S.C. 154(b) by 397 days.

(21) Appl. No.: 17/710,412

(22) Filed: Mar. 31, 2022

(65) Prior Publication Data
US 2023/0319502 A1    Oct. 5, 2023

(51) Int. Cl.
*G06F 3/12*    (2006.01)
*H04W 4/02*    (2018.01)

(52) U.S. Cl.
CPC .................................. *H04W 4/023* (2013.01)

(58) Field of Classification Search
None
See application file for complete search history.

(56) References Cited

U.S. PATENT DOCUMENTS

| | | | |
|---|---|---|---|
| 10,178,737 B2 | 1/2019 | Mohan et al. | |
| 2021/0194643 A1* | 6/2021 | Parkvall | H04L 1/1854 |
| 2021/0243553 A1* | 8/2021 | Elindra | H04W 4/021 |

* cited by examiner

*Primary Examiner* — Frantz Bataille

(57) ABSTRACT

A flexible workspace system with real-time sensor feedback comprises workstations, presence sensors, workstation transmitters, a mobile device, and an upstream device. The workstations are established within a predetermined area, and each workstation includes a substantially horizontal surface having an upper side and a lower side. A presence sensor is positioned at the lower side of each workstation and detects a potential occupancy proximate an underside area below the lower side. A workstation transmitter is positioned at each workstation and coupled to the presence sensor and transmits an occupancy signal based on the potential occupancy detected by the presence sensor. The mobile device is situated within the predetermined area and detects the occupancy signal transmitted by the workstation transmitter and transmits a check-in signal based on the occupancy signal. The upstream device communicates with the mobile device and associates a target workstation with the mobile device based on the check-in signal.

20 Claims, 8 Drawing Sheets

FLEXIBLE WORKSPACE SYSTEM WITH REAL-TIME SENSOR FEEDBACK FOR MOBILE CHECK-IN

RELATED APPLICATIONS

This application relates to U.S. patent application Ser. No. 17/710,461, titled Flexible Workspace System with Real-Time Sensor Feedback for an Environment, by Mohan, Tanuj, et al., filed on Mar. 31, 2022, and U.S. patent application Ser. No. 17/710,501, titled Flexible Workspace System with Real-Time Sensor Feedback for Cleaning Status, by Nee, Colm, et al., filed on Mar. 31, 2022. These applications are incorporated by reference in their entirety.

FIELD OF THE INVENTION

This application relates to the field of building systems and, more particularly, to a management system for flexible shared workspaces with real-time sensor feedback.

BACKGROUND

Recent trends towards flexible work require a change in how organizations manage their workspaces. Employees will work in the office on unpredictable schedules, which means they can be in the office at different times. Employers have an opportunity to reduce their office footprint by eliminating permanently assigned workspaces for each employee and using desk hoteling to provide spaces on-demand. Employers can also re-allocate previously permanent workspace as flexible workspaces that suit the specific tasks. Employees can choose to come to the office instead of working from home for various reasons, such as a quiet space to concentrate, collaboration spaces, lab spaces, etc.

This increasing trend in the workplace presents several problems to employers and facility operators. Occupants can find it challenging to locate and reserve available workspaces. Also, there is no assurance for occupants that workspaces meet their individual needs. Facility operators can be challenged to make efficient use of workspaces that are reserved but not used. Employers can find it difficult to incentivize their workforce to come to the office in a hybrid work from a home environment.

Conventional workspaces use the company calendar system (e.g., Google Calendar and Microsoft Outlook) to make desks available to potential occupants, similar to how employees manage conference rooms. Employees book a meeting with an available hot desk for the period of time they are expected to be in the office. These conventional workspaces can provide limited and static information about the space, for example, what equipment is available at the hot desk and how many seats are in a meeting room, etc. Some dedicated hoteling act in a similar manner to a calendar-based reservation system, with the addition of floor plans enabling users to see the location of available hot desks. Dedicated hoteling can also offer displays placed at a workspace to show the availability of the space on-location and allow check-in to the space upon arrival of an occupant. One common problem is that reserved spaces might not be checked-in or otherwise utilized.

These conventional workspaces address some of the problems relating to management of workspaces as shared resources. There are however many shortcomings to these approaches. Reservation systems that use an existing calendar scheduling system can give users static information about the workspace (e.g., number of chairs), but they cannot consider dynamic and real-time conditions (e.g., temperature, ambient light level). Software-based desk hoteling solutions aim to minimize unused spaces by asking users to check-in to a reserved workspace and making the space available for others to reserve if the user does not check-in on time. These software-only solutions rely on manual user action. When users fail to remember or bother to check-in, overlapping reservations result and cause significant loss of time as users search for a genuinely available space. The accuracy of utilization data generated by software-only reservation systems is also limited by the diligence of its users.

SUMMARY

In accordance with one embodiment of the disclosure, there is provided a management approach for flexible workspace system that utilizes real-time sensor feedback. The approach uses Internet of Things ("IoT") technologies to automate and improve the user experience of employees, facility managers, and other stakeholders in a flexible workspace environment. The flexible workspace system allows users to specify their preferences for a range of attributes associated with a workspace they seek to reserve, matches user preferences to real-time conditions across the available workspaces, and provides users with available workspaces that best meet their individual needs. The system uses IoT sensor technology to monitor real-time conditions of workspaces and automatically manages workspace availability by using a range of IoT sensor technologies to monitor workspace occupancy. Accordingly, the system captures workspace utilization data and optimizes workspace activities, such as cleaning and maintenance, based on the captured data.

The flexible workspace system includes sensors that monitor workspace environmental conditions, such as temperature, ambient light, humidity, noise, and the like. The system may match users with a workspace that best meets their individual needs and preferences, in particular conditions which are dynamic across a facility and over time. Increased user comfort have a range of benefits, including increased productivity, higher employee retention, and improved office attendance in a hybrid remote work environment.

One aspect is a flexible workspace system with real-time sensor feedback comprising workstations, presence sensors, workstation transmitters, a mobile device, and an upstream device. The workstations are established within a predetermined area, and each workstation includes a substantially horizontal surface having an upper side and a lower side. A presence sensor is positioned at the lower side of each workstation, and the presence sensor detects a potential occupancy proximate an underside area below the lower side. A workstation transmitter is positioned at each workstation and coupled to the presence sensor, and the workstation transmitter transmits an occupancy signal based on the potential occupancy detected by the presence sensor The mobile device is situated within the predetermined area, and the mobile device detects the occupancy signal transmitted by the workstation transmitter and transmits a check-in signal based on the occupancy signal. The upstream device communicates with the mobile device, and the upstream device associates a target workstation with the mobile device based on the check-in signal.

Another aspect is a method of a flexible workspace system with real-time sensor feedback. Workstations located within a predetermined area are established, and each workstation includes a substantially horizontal surface having an upper side and a lower side. A potential occupancy proximate an underside area below the lower side is detected at a presence sensor, in which the presence sensor is positioned at the lower side of each workstation. An occupancy signal based on the potential occupancy detected by the presence sensor is transmitted at a workstation transmitter, in which the workstation transmitter is positioned at each workstation and coupled to the presence sensor. The occupancy signal transmitted by the workstation transmitter is detected at a mobile device and a check-in signal based on the occupancy signal is transmitted, in which the mobile device is situated within the predetermined area. A target workstation is associated with the mobile device by an upstream device based on the check-in signal, in which the upstream device communicates with the mobile device.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

FIG. 7 is a flow diagram of a second operation of the flexible workspace system in an example implement that utilizes real-time feedback of a presence sensor for mobile check-in.

DETAILED DESCRIPTION

Figure 1:
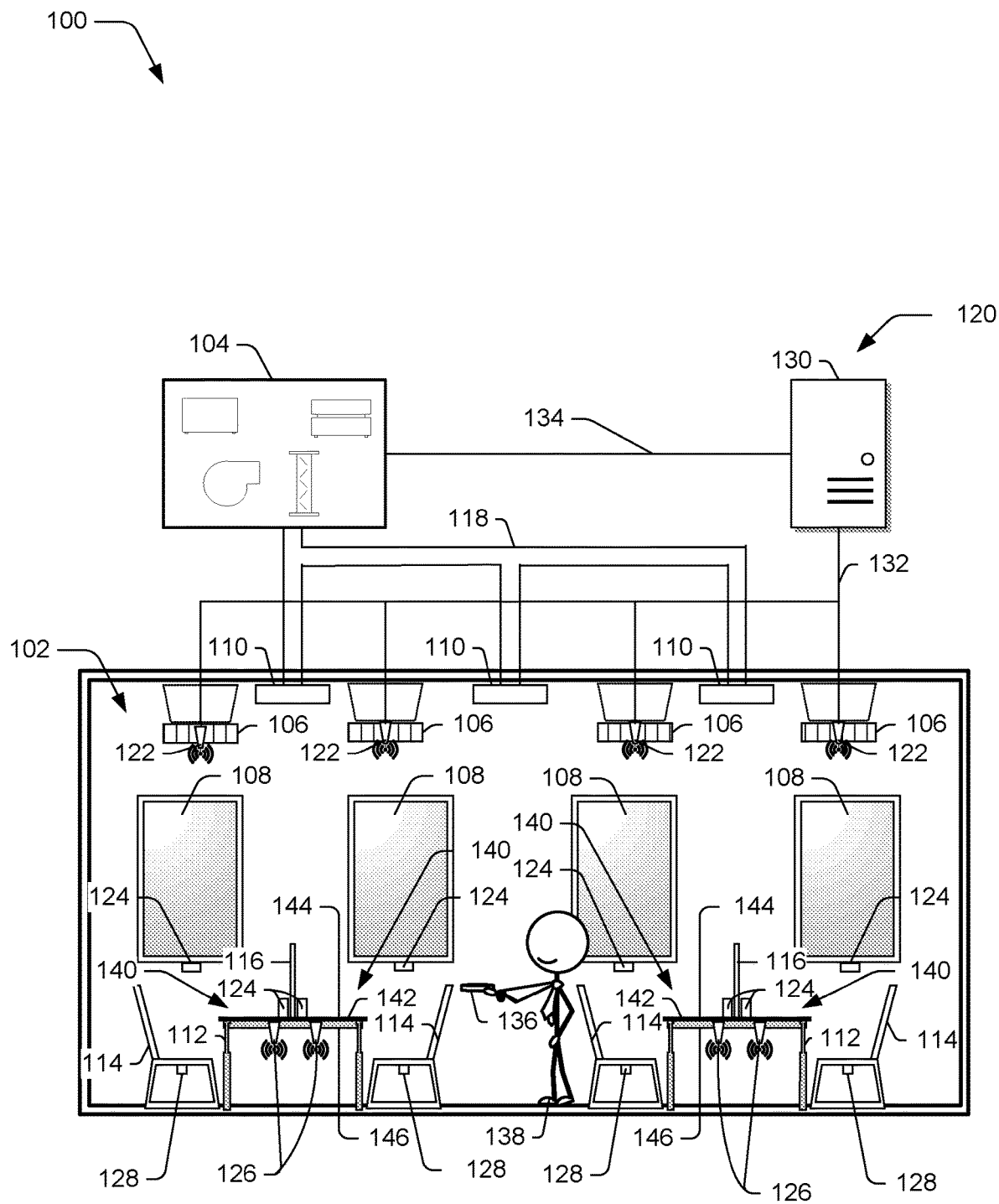
FIG. 1 is an illustration of a facility in an example implementation that is operable to employ techniques described herein.

Various technologies that pertain to systems and methods that facilitate flexible workspace management will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

The system utilizes Internet of Things ("IoT") technologies to automate and improve the user experience of employees, facility managers, and other stakeholders in a flexible workspace environment. In particular, the system uses IoT sensor technology to monitor real-time conditions of workspaces and automatically manages workspace availability by using a range of IoT sensor technologies to monitor workspace occupancy. Accordingly, the system captures workspace utilization data and optimizes workspace activities, such as cleaning and maintenance, based on the captured data.

A distributed set of environmental sensors allows the effectiveness of the building's various environment management systems to be monitored and adjusted with improved accuracy. For example, the data collected by temperature sensors installed in meeting rooms can be used to identify areas that are underserved by the HAVC system. Operations can use this information to adjust dampers or otherwise rebalance airflow to the space and measure the success of these changes. Areas that have lighting control issues (e.g., non-functional fixtures, poor daylighting management, etc.) may also be automatically identified from ambient light level information collected by the system.

Referring to FIG. 1, there is shown a facility 100, representing a single facility or group of facilities, in an example implementation that is operable to employ techniques described herein. The facility 100 includes one or more predetermined areas 102 managed by one or more environmental controls 104. An environmental control 104 manages environment conditions of the area or areas 102. Example of the environment conditions include, but are not limited to, temperature, ventilation, humidity, lighting, noise level, emergency conditions, and other conditions that may impact an occupants health, comfort, and safety. Each predetermined area 102 of the facility 100 includes environmental devices 106-116, and the environmental control 104 manages the environmental conditions via the environmental devices. Examples of environmental devices include fixed devices such as light fixtures 106, windows 108, vents 110, and fire/smoke detection equipment as well as non-fixed devices such as tables 112, chairs 114, etc. Some devices, such as partitions 116, may be considered fixed devices as well as non-fixed devices. The environmental control 104 may be connected to the environmental devices 106-116 by electrical or mechanical connections 118, such as the conduits guiding air to and from the vents 110 as shown in FIG. 1.

Each facility 100 includes a flexible workspace system 120 that continuously collects environmental data (e.g., temperature, ambient light level, humidity, noise level, etc.) using sensors that are placed throughout the workplace. Each sensor may monitor several workspaces at once, or may be placed individually in each workspace. Example of sensors include, but are not limited to, illumination sensor 122, monitoring device or environmental sensors 124 (such as temperature), presence sensors 126, motion sensors 128, and other sensors for detecting, analyzing, and/or transmitting environmental data proximal to the sensor. It is to be understood that the sensors shown in FIG. 1 are representations that are not to scale and are not restricted to the positions shown. For example, any or all of the sensors may be positioned near a ceiling, wall, floor, partition, fixed object, non-fixed object (such as furniture), etc., as needed for desired for accurate or convenient detection of the environmental data.

In addition to one or more kinds of sensors 122-128, the system 102 includes an upstream device 130 communicating with the sensors. The upstream device 130 represents one or more computing devices that may be located at the facility, remote from the facility, or both where some computing devices are located at the facility whereas other computing devices are located remotely. The upstream device 130 may communicate with one or more groups of sensors 122-128 via a wired or wireless link 132. For example, the upstream device 130 may utilize wired technology for communication, such as transmission of data over a physical conduit, e g., an electrical or optical fiber medium. For another example, the upstream device 130 may also utilize wireless technology for communication, such as radio frequency (RF), infrared, microwave, light wave, and acoustic communications. For some embodiments, the upstream device 130 may also communicate with the environmental control 104 via a similar or another wired or wireless link 134. For example, the upstream device 130 may send to, or receive from, the environmental control 104 temperature, humidity, or ventilation information corresponding to the predetermined area 102. For some embodiments, the upstream device 130 may also communicate with one or more mobile devices 136 located within the predetermined areas. The mobile devices 136 may be transported or otherwise supported by a user 138, or the mobile device may be self-propelled.

For some embodiments, multiple workstations 140 may be located within the predetermined area 102. A workstation 140 may be a cube, desk, or other designated area for utilization by a single person or multiple people. For example, a workstation 140 may be a desk separated from one or more other desks by a physical or virtual partition 116. An example of a virtual partition is a predetermined distance from a neighboring workstation. As another example, a workstation 140 may be a conference room or meeting area where one or more people may congregate. One or more sensors may be positioned above an open area, such as a meeting corner, and report occupancy data.

For some embodiments, each workstation may include a substantially horizontal surface 142 having an upper side 144 and a lower side 146. For example, a sensor 122-128 (such as the presence sensor 126) may be positioned at the lower side of the corresponding workstation 140. The presence sensor 126 positioned at each workstation 140 may detect a potential occupancy proximate to the corresponding workstation. For another example, a sensor 122-128 (such as the monitoring device or environmental sensor 124) may be positioned at or above the upper side 144 of the corresponding workstation 140. For some embodiments, a sensor 122-128 (such as the monitoring device or environmental sensor 124) may be co-located with the presence sensor 126 of each workstation at the lower side 146 of the corresponding workstation 140 (not shown in FIG. 1). The monitoring device or environmental sensor 124 positioned at each workstation 140 may detect a workspace environment proximate the corresponding workstation.

The presence sensors 126 may be passive sensors, active sensors, or both. For passive sensors, the presence sensor 126 detects a presence, or potential presence, of a user in proximity to the sensor and/or corresponding workstation 140. For example, the presence sensor 126 may be a motion sensor using technology based on infrared, camera, acoustic, temperature, or other form of passive presence detection, to detect the presence of a user or potential user. For active sensors, the presence sensor 126 detects a signal from a mobile device of a user in proximity to the sensor and/or corresponding workstation 140. For example, the presences sensor 126 may include a signal received using technology based on radio frequency ("RF"), infrared, acoustic, or other form of signal communication, to detect the presence of a user or a potential user. For example, an RF sensor may be used to identify users based on radio frequency identification ("RFID") or similar identifying technology that incorporates electromagnetic or electrostatic coupling in radio frequency portion of the electromagnetic spectrum to identify a person or object.

Figure 2:
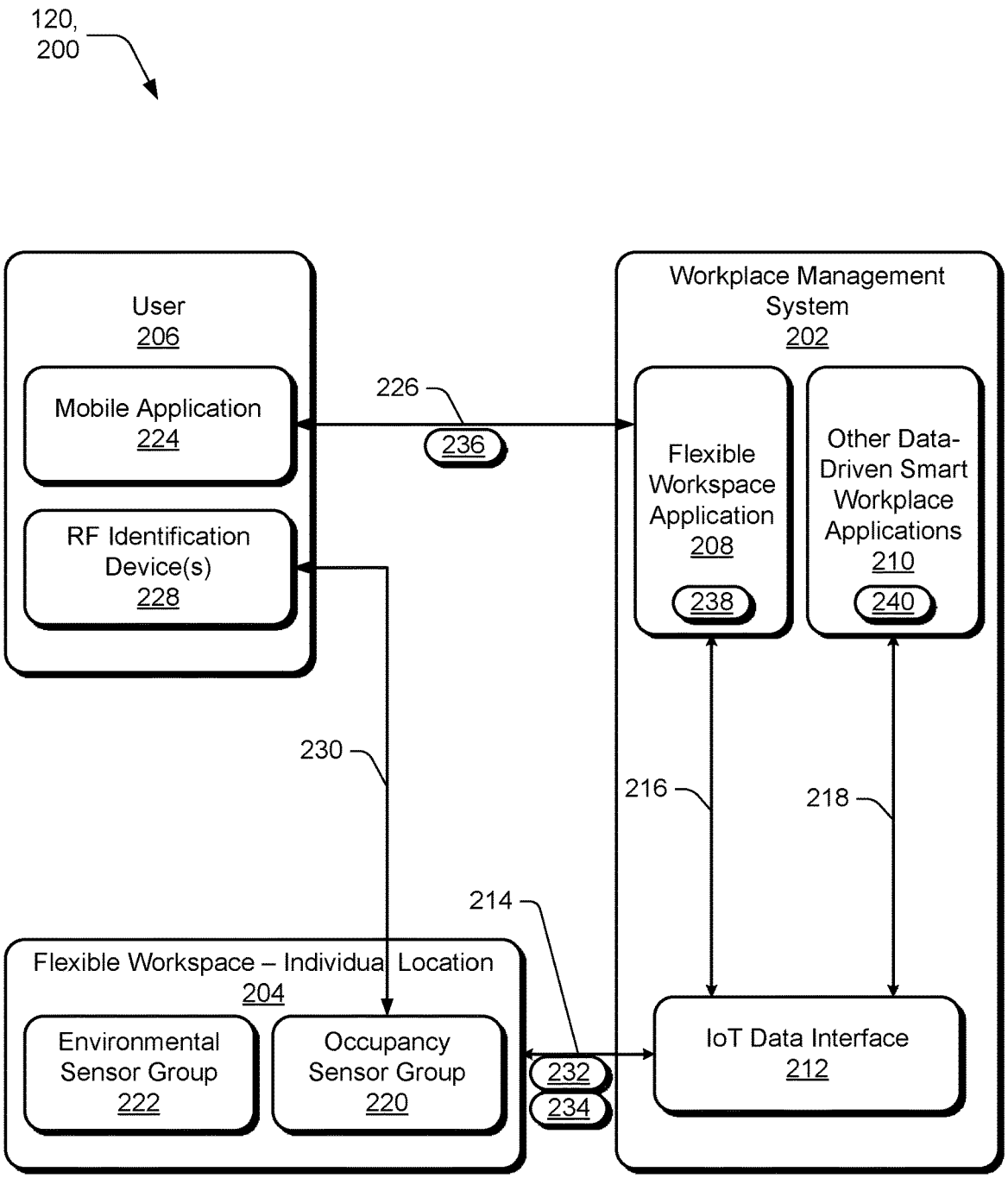
FIG. 2 depicts a flexible workspace system in an example implementation for managing the facility of FIG. 1.

Referring to FIG. 2, there is shown a generalized architecture 200 of the flexible workspace system 120 in an example implementation for managing the facility. The system 120 of this architecture 200 includes a workplace management system 202, such as an upstream device 130, communicating with multiple individual locations 204, such as workstations 140. The workplace management system 202 represents one or more computing devices that may be located at the facility, remote from the facility, or both. For some embodiments, the system 120 of this architecture 200 may interact with one or more mobile devices 206 operating or otherwise located within the predetermined area 102.

The workplace management system 202 may include a flexible workspace application 208, other data-driven smart workplace applications 210, and an Internet of Things ("IoT") data interface 212. The flexible workspace application 208 performs one or more functions of the workplace management system 202 for managing the operation and maintenance of the individual locations 204. For example, the flexible workspace application 208 may perform the function, and associated operations, relating to real-time sensor management of an environment, real-time sensor management of mobile check-in, or real-time sensor management of a cleaning status as described herein. The other smart workspace applications may operate in conjunction with, or separately from, the flexible workspace application 208. For example, two or more applications may operate in the workspace management system 202, such as a combination of the real-time sensor management of an environment, the real-time sensor management of mobile check-in, and the real-time sensor management of a cleaning status. The IoT data interface 212 may receive and process data received from one or more individual locations (such as flexible workspace—individual location 204) via a first link 214. Examples of the received data include, but are not limited to, environmental sensor data 232 and occupancy (presence) sensor data 234. The IoT data interface 212 may provide the incoming data, or a processed version thereof, to the flexible workspace application 208 and/or other smart workplace applications 210 via second and third links 216, 218, respectively. For some embodiments, provide commands to the corresponding individual locations in response to the received data, such as indicator information. Accordingly, the IoT data interface 212 may provide commands from the applications 208, 210, via the second link 216 and the third link 218, to the corresponding individual locations 204 via the first link 214.

Each of the individual locations 204 includes an occupancy sensor group 220 and, for some embodiments, may include an environmental sensor group 222 as well. The occupancy sensor group 220 includes at least one presence sensor positioned at each workstation 204 in which each presence sensor detects a potential occupancy proximate to the corresponding workstation. The occupancy sensor data 234 may be provided to the workplace management system 202 via the first link 214 and the corresponding individual location 204 may receive a command in response to the occupancy sensor data 234. Examples of occupancy sensor data 234 include, but are not limited to, active or passive IR, temperature, microphone(s), user-identifying RF devices (i.e., Bluetooth beacon, UWB, etc.), and the like. For embodiments that include the environmental sensor group 222, the group includes at least one environmental sensor positioned at each workstation 204, in which the environmental sensor detects a workspace environment proximate the corresponding workstation. For example, the environmental sensor may detect the environmental sensor data 232 associated with a workspace environment proximate the corresponding workstation. Example of the workspace environment include, but are not limited to, temperature, ventilation, humidity, lighting (such as ambient light level), noise level, emergency conditions, and other conditions that may impact an occupants health, comfort, and safety.

For some embodiments, the system 120 of this architecture 200 may include one or more mobile devices 206. The mobile device 206 may includes a mobile application 224 communicating wirelessly with the workplace management system 202 and/or the individual locations 204. The mobile application 224 includes user management functions and, for some embodiments, further includes reservation management and/or indoor navigation. For some embodiments, the mobile application 224 may provide global user preferences 236 corresponding to the mobile device 206 via a fourth link 226 as well as a reservation information via the fourth link. Examples of reservation information include, but are not limited to, date, time, and reservation specific user preferences. In response, the workplace management system 202 may provide workspace availability information via the fourth link 226. Examples of workspace availability information include, but are not limited to, identifications of available workspaces ordered by match to the received user preferences, such as the global user preferences 236. For some embodiments, the mobile device 206 may include a wireless communication component 228 (such as RF identification device(s)) to communicate with one or more individual locations 204. The mobile device 206 communicate with each individual location 204 via an RF link 230 (i.e., fifth link) that utilizes Bluetooth, UWB, or similar wireless communication technology.

For the system 120, data is ingested into the upstream device 130, such as the workplace management system 202, that may be hosted in the cloud or on-premises. The flexible workspace application 208 of the system 120 may include a workspace matching engine 238, and the smart workplace applications 210 may include a reservation engine 240. The workplace matching engine 238 and the reservation engine 240 may interact with components of each individual location 204 and each mobile device 206 (e.g., the mobile application 224) and the individual locations (e.g., the sensor groups 220, 222). For example, each mobile device 206 may be provisioned in the system 120 with user-specific preferences communicated via the fourth link 226 across a range of workspace attributes that the system 202 may monitor (for example, temperature preferences and the like). A mobile device 206, including its associated user, may seek a workspace, i.e., individual location 204, and transmit a request to the workplace management system 202. The mobile device 206 may provide details such as a range of dates/times and any reservation-specific preferences for the workspace (e.g., size of the space, whether a quiet space is required, etc.) via the fourth link 226. The matching engine 238, such as the flexible workspace application 208, may use either current conditions (in the case of an immediate request for space) or predicted future conditions based on historical data (for reservations in the future) to locate workspaces or individual locations 204 that meet the user's global preferences and any reservation-specific preferences provided to the flexible workspace application 208.

When a mobile device 206 arrives at its designated and/or reserved workspace, i.e., individual location 204, the system 200 may use one or more presence sensors of the occupancy sensor group 220 to automatically start a reservation and mark the workspace as unavailable or in-use. The system 200 may determine workspace availability based one of several possible technologies of the occupancy sensor group 220, such as IR sensing and microphones, or a combination of components of the workplace management system 202, individual location 204, and/or mobile device 206, such as RF-identification devices 220, 228. The system may further determine workspace availability using data processing at one or more components 202, 204, 206, such as analyzing duration of detection. If a sensor of the occupancy sensor group 220 does not trigger, a reservation may be cancelled automatically by the reservation engine at the workplace management system 202 based on real-time conditions of the workspace at the individual location 204, freeing it for other users.

Various data collected for the purpose of flexible workspace reservation, such as the environmental and occupancy data collected by the sensor group or groups 220, 222, may also be available for other workspace-related activities. For example, workspace cleaning schedules may be generated automatically based on the real-world occupancy history collected by the workplace management system 202. In response, workspaces with high utilization may be cleaned more frequently while workspaces with no utilization can be omitted from the schedule. Accordingly, the system 200, particularly the workplace management system 202, may manage one or more predetermined areas 102 of the facility 100 by efficient allocation of cleaning resources (e.g., minimizing cleaning costs) and reliable cleaning of workspaces for it's users. Presence sensors of the occupancy sensor group 220 may identify individuals (such as, RF tags) deployed as part of the flexible workspace solution, and the system 200 may leverage the occupancy sensor group to track automatically the cleaning status of one or more workspaces based on the presence of mobile devices and their associated users.

Environmental data monitored by the environmental sensor group 222 of the system 200 may be used by the flexible workspace application 208 of the workplace management system 202 to identify building maintenance needs. For example, temperature history data provided by the environmental sensor group 222 of one or more individual locations 204 may identify workspaces that might be underserved by the building HVAC systems (i.e., the environmental controls 104). An operator of the facility 100 may proactively address concerns (such as, ductwork tuning/balancing) and continue to use the environmental data to measure the effect of the change.

Figure 3:
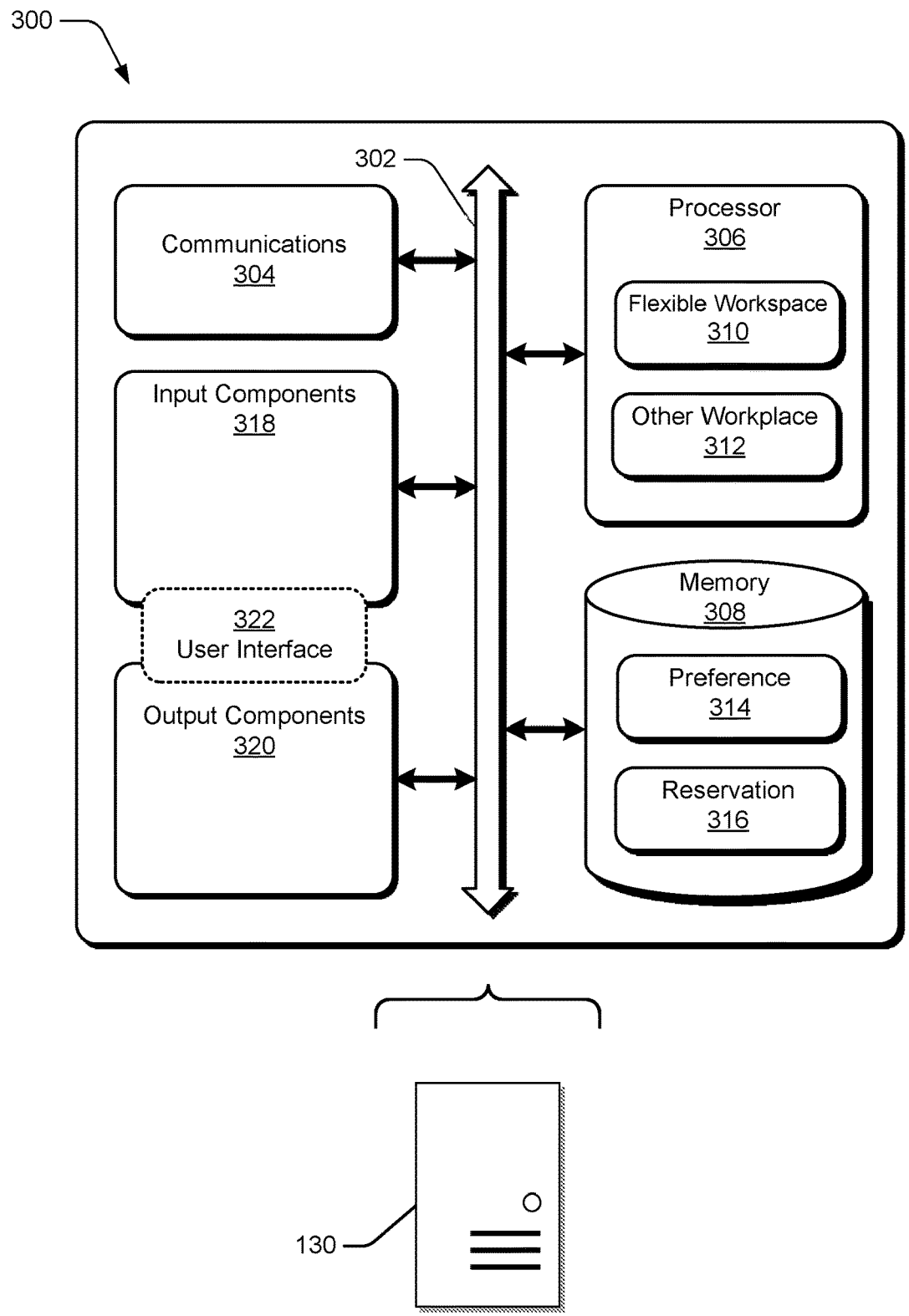
FIG. 3 is a block diagram of the upstream device of FIG. 1 in an example implementation.

Referring to FIG. 3, in conjunction with FIG. 1, there is shown a block diagram of the upstream device 130, described above in reference to FIG. 1, in an example implementation. The upstream device 130 performs various functions of the system 120 by interacting with one or more sensors 122-128 and/or one or more mobile devices 136. For some embodiments, the upstream device 130 associates a target workstation 140 with a mobile device 136 based on the potential occupancy, the workspace environment, and a user preference associated with the mobile device. For example, the upstream device 130 may associate the target workstation 140 with the mobile device 136 by correlating the workspace environment of each workstation with the user preference. For some embodiments, the upstream device 130 communicates with the mobile device 136, and the upstream device associates a target workstation 140 with the mobile device based on a check-in signal. For example, the upstream device 130 may register the mobile device 136 based on the check-in signal by associating the target workstation 140 corresponding to the transmitted the occupancy signal with the mobile device.

FIG. 3 represents example device components 300 of the upstream device 130, such as the workplace management system 202, for the managing various controls of one or more workstations 140 (namely sensors/device 122-128) and/or mobile devices 136. The upstream device 130 may also be multiple servers and/or computing devices, so the example device components 300 may represent part or all of the components of each server and/or device. The upstream device 130 may communicate with sensors of the workstations, such as presence and environmental sensors, as well as mobile devices situated in the predetermined area. The upstream device 130 is located upstream from the workstations and their associated devices, such as corresponding monitoring devices and sensor.

The device components 300 comprise a communication bus 302 for interconnecting other device components directly or indirectly. The other device components include one or more communication components 304 communicating with other entities via a wired or wireless network, one or more processors 306, and one or more memory components 308.

The communication component 304 communicates (i.e., receives and/or transmits) data associated with one or more devices of the system 120, such as mobile devices 136 and workstations 140. The communication component 304 may utilize wired technology for communication, such as transmission of data over a physical conduit, e.g., an electrical or optical fiber medium. The communication component 304 may also utilize wireless technology for communication, such as radio frequency (RF), infrared, microwave, light wave, and acoustic communications. RF communications include, but are not limited to, Bluetooth (including BLE), ultrawide band (UWB), Wi-Fi (including Wi-Fi Direct), Zigbee, cellular, satellite, mesh networks, PAN, WPAN, WAN, near-field communications, and other types of radio communications and their variants.

The processor or processors 306 may execute code and process data received from other components of the device components 300, such as information received at the communication component 304 or stored at the memory component 308. The code associated with the upstream device 130 and stored by the memory component 308 may include, but is not limited to, operating systems, applications, modules, drivers, and the like. An operating system includes executable code that controls basic functions, such as interactions among the various components of the device components 300, communication with external devices via the communication component 304, and storage and retrieval of code and data to and from the memory component 308.

Each application includes executable code to provide specific functionality for the processor 306 and/or remaining components of the upstream device 130. Examples of applications executable by the processor 306 include, but are not limited to, a flexible workspace module 310 and other workplace modules 312. Examples of the flexible workspace module 310 include, but are not limited to, real-time sensor management of an environment, real-time sensor management of mobile check-in, or real-time sensor management of a cleaning status as described herein. For some embodiments, the flexible workspace module 310 of the upstream device 130 may associated with a target workstation of the multiple workstations with a mobile device located within the predetermined area based on various data, such as potential occupancy, workspace environment, and/or check-in signals. For some embodiments, the flexible workspace module 310 of the upstream device 130 may track a cleaning record associated with the maintenance of the workstations based on presence data and an occupancy record associated with occupancy of the workstations. Example of the other workplace modules 312 include, but are not limited to a reservation engine or a combination of the real-time sensor management of an environment, the real-time sensor management of mobile check-in, and the real-time sensor management of a cleaning status.

Data stored at the memory component 308 is information that may be referenced and/or manipulated by an operating system or application for performing functions of the upstream device 130. Examples of data associated with the upstream device 130 and stored by the memory component 308 may include, but are not limited to, preference data 314 and reservation data 316. The preference data 314 includes global user data and hot desk requests, such as date, time, reservation-specific user preferences, and the like. The reservation data 316 includes information about available workspace, such as an occupancy record associated with occupancy of the workstations, and other properties of the workspaces, such as a cleaning record associated with maintenance of the workstations based on presence data.

The device components 300 may include one or more input components 318 and one or more output components 320. The input components 318 and output components 320 of the device components 300 may include one or more visual, audio, mechanical, and/or other components. For some embodiments, the input and output components 318, 320 may include a user interface 322 for interaction with a user of the device. The user interface 322 may include a combination of hardware and software to provide a user with a desired user experience.

It is to be understood that FIG. 3 is provided for illustrative purposes only to represent examples of the upstream device 130 and is not intended to be a complete diagram of the various components that may be utilized by the system 120. Therefore, the upstream device 130 may include various other components not shown in FIG. 3, may include a combination of two or more components, or a division of a particular component into two or more separate components, and still be within the scope of the present invention.

Figure 4:
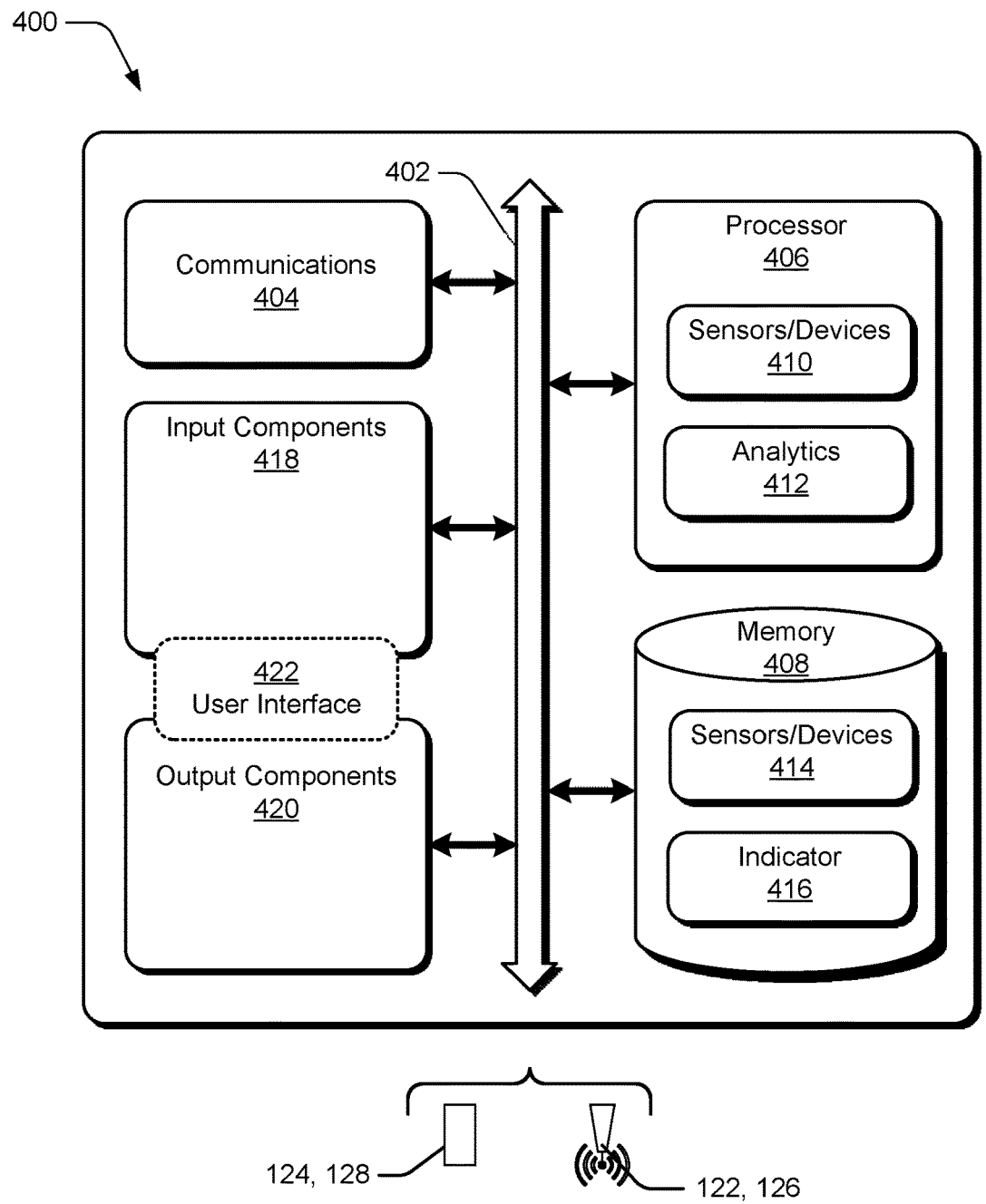
FIG. 4 is a block diagram of each sensor and/or each monitoring device of FIG. 1 in an example implementation.

FIG. 4 represents example device components 400 of each sensor and/or monitoring device, such as the sensors and devices of the occupancy sensor group 220 and the environmental sensor group 222, for managing data for the upstream device 130 as well as the mobile devices 136. The example device components 400 may represent part or all of the components of each server and/or device 122-128. The device components 400 comprise a communication bus 402 for interconnecting other device components directly or indirectly. The other device components include one or more communication components 404 communicating with other entities via a wired or wireless network, one or more processors 406, and one or more memory components 408. The communication component 404 communicates (i.e., receives and/or transmits) data associated with one or more devices of the system 120, such as the upstream device 130 and mobile devices 136, by utilizing wired or wireless technology for communication, as described above for the upstream device.

The processor or processors 406 may execute code and process data received from other components of the device components 400, similar to the upstream device 130 as described above. Each application of the processor(s) 406 includes executable code to provide specific functionality for the processor 406 and/or remaining components of the sensors and devices 122-128. Examples of applications executable by the processor 406 include, but are not limited to, a sensors/devices module 410 and an analytics module 412. The sensors/devices module 410 operates the sensor(s) and/or monitoring device(s) to detect conditions proximate to the corresponding workstation (such as potential occupancy, presence status, workspace environment, and/or cleaning status. The analytics module 412 may performs analytics on the detected conditions, for some embodiments, such as determining presence status or potential occupancy based on the data collected by the presence sensor. Information determined by the sensors/devices module 410 and the analytics module 412 may be provided to the upstream device 130 where an occupancy record and/or cleaning record are stored and tracked. In addition, ambient light level, passive infrared, and/or temperature may be analyzed by sensors positioned under a horizontal surface 142 of a workstation 140, where lighting and temperature conditions are different from a ceiling or other locations within the predetermined area 102.

Data stored at the memory component 408 is information that may be referenced and/or manipulated by an operating system or application for performing functions of the sensors and devices 122-128. Examples of data associated with the sensors and devices 122-128 and stored by the memory component 408 may include, but are not limited to, sensor/device data 414 and indicator data 416. The sensor/device data 414 includes potential occupancy, workspace environment, occupancy signal, presence status, and the like. The indicator data 416 includes a workstation status based on an occupancy record and a cleaning record tracked by the upstream device 130 and associated with the corresponding workstation.

The device components 400 may include one or more input components 418 and one or more output components 420. The input components 418 and output components 420 of the device components 400 may include one or more visual, audio, mechanical, and/or other components. For some embodiments, the input and output components 418, 420 may include a user interface 422 for interaction with a user of the device. The user interface 422 may include a combination of hardware and software to provide a user with a desired user experience.

Examples of input components 418 include, but are not limited to, presence sensors 122, 126, and environmental sensors and/or monitoring devices 124. Each presence sensor 122, 126 may be positioned at each workstation 140 to detect a potential occupancy proximate to the corresponding workstation. For example, a presence sensor 122, 126 may be positioned at a lower side 146 of a horizontal surface 142 of a workstation 140 to detect a potential occupancy proximate an underside area below the lower side. Each environmental sensor 124 may be positioned at each workstation 140 to detect a workspace environment proximate the corresponding workstation. Each monitoring device 124 may be positioned at each workstation 140 and include one or more presence sensors and one or more indicators. Each presence sensor of the monitoring device 124 identifies a presence status of the corresponding workstation 140, and each indicator of the monitoring device indicates a workstation status based on an occupancy record and a cleaning record associated with the corresponding workstation. For example, the monitoring device 124 may receive a cleaning input via wireless communication from a mobile device 136 within the predetermined area 102. The indicator at the monitoring device 124 and the cleaning record at the sensors and devices 122-128 may be updated based on the cleaning input by the monitoring device, the mobile device 136, or both.

Examples of output components 420 include, but are not limited to, workstation transmitters and indicators. Each workstation transmitter may be positioned at each workstation and coupled to the presence sensor 122, 126. Each workstation transmitter may transmit an occupancy signal based on the potential occupancy detected by the presence sensor 122, 126. Each indicator may indicate the workstation status by type of color, intensity, duration of illumination, or any combination of these properties. For some embodiments, the indicator may indicate a non-positive condition based on a non-clean status of the corresponding workstation by the cleaning record and a detected status by the presence detector of the corresponding workstation. For some embodiments, the indicator may indicate a positive condition based on a clean status of the corresponding workstation by the cleaning record and a non-detected status by the presence detector of the corresponding workstation. For some embodiments, the indicator may indicate a positive condition based on a clean status of the corresponding workstation by the cleaning record and an available status by the occupancy record of the corresponding workstation.

Similar to FIG. 3, it is to be understood that FIG. 4 is provided for illustrative purposes only to represent examples of the sensors and devices 122-128 and is not intended to be a complete diagram of the various components that may be utilized by the system 120. Therefore, the sensors and devices 122-128 may include various other components not shown in FIG. 4, may include a combination of two or more components, or a division of a particular component into two or more separate components, and still be within the scope of the present invention.

Figure 5:
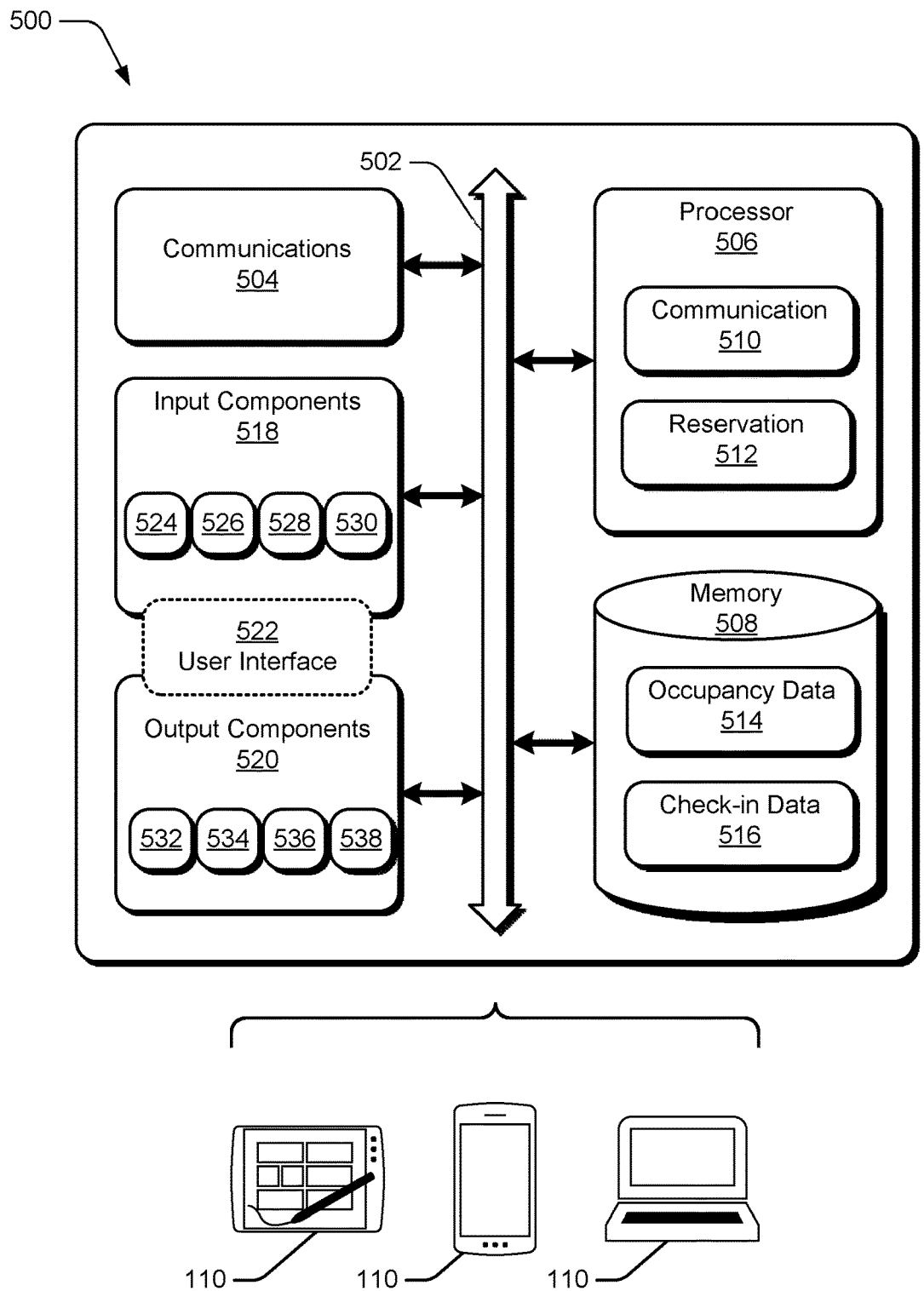
FIG. 5 is a block diagram of the mobile device of FIG. 1 in an example implementation.

FIG. 5 represents example device components 500 of each mobile device 136, such as the mobile device 206, for managing control and/or data for the upstream device 130 as well as the workstations 140. The device components 500 comprise a communication bus 502 for interconnecting other device components directly or indirectly. The other device components include one or more communication components 504 communicating with other entities via a wired or wireless network, one or more processors 506, and one or more memory components 508. The communication component 504 communicates data associated with one or more devices of the system 120, such as the upstream device 130 and the mobile device 136, by utilizing wired or wireless technology for communication, as described above for the upstream device 130 and sensors/devices 122-128.

The processor or processors 506 may execute code and process data received from other components of the device components 500, similar to the upstream device 130 and the sensor/device 122-128 as described above. Examples of applications executable by the processor 506 include, but are not limited to, a communication module 510 and a mobile reservation module 512. The communication module 510 operates communication of information with the upstream device 130 and/or sensors/device 122-128, such as occupancy signals received from workstations and check-in signals transmitted to the upstream device. The mobile reservation module 512 manages information associated with one or more workspace reservations of the mobile device 136, such as mobile check-in and area navigation. For example, the mobile device 136 may detect the occupancy signal transmitted by the workstation transmitter and transmitting a check-in signal based on the occupancy signal.

Data stored at the memory component 508 is information that may be referenced and/or manipulated by an operating system or application for performing functions of the mobile device 136. Examples of data associated with the mobile device 136 and stored by the memory component 508 may include, but are not limited to, occupancy data 514 and check-in data 516. The occupancy data 514 includes information relating to occupancy signals transmitted by the workstation transmitter of one or more workstations. The check-in data 516 includes information related to check-in signals based on the occupancy signal that are transmitted to the upstream device 130.

The device components 500 may include one or more input components 518 and one or more output components 520. The input components 518 and output components 520 of the device components 500 may include one or more visual, audio, mechanical, and/or other components. For some embodiments, the input and output components 518, 520 may include a user interface 522 for interaction with a user of the device. For example, the output component 520 may present a target workstation at a display of the mobile device based on potential occupancy and the workspace environment. As another example, the mobile device 136 includes a positioning component to determine, in whole or in part, the position of the mobile device within the predetermined area 102. The mobile device 136 may presents navigation data at the output component 520 indicating a position of the mobile device relative to a position of the target workstation 140. In addition, the mobile device 136 may guide a user find people of interest within the predetermined area 102 or the facility 100.

Similar to FIGS. 3 and 4, it is to be understood that FIG. 5 is provided for illustrative purposes only to represent examples of the mobile devices 136 and is not intended to be a complete diagram of the various components that may be utilized by the system 120. Therefore, the mobile devices 136 may include various other components not shown in FIG. 5, may include a combination of two or more components, or a division of a particular component into two or more separate components, and still be within the scope of the present invention.

Figure 6:
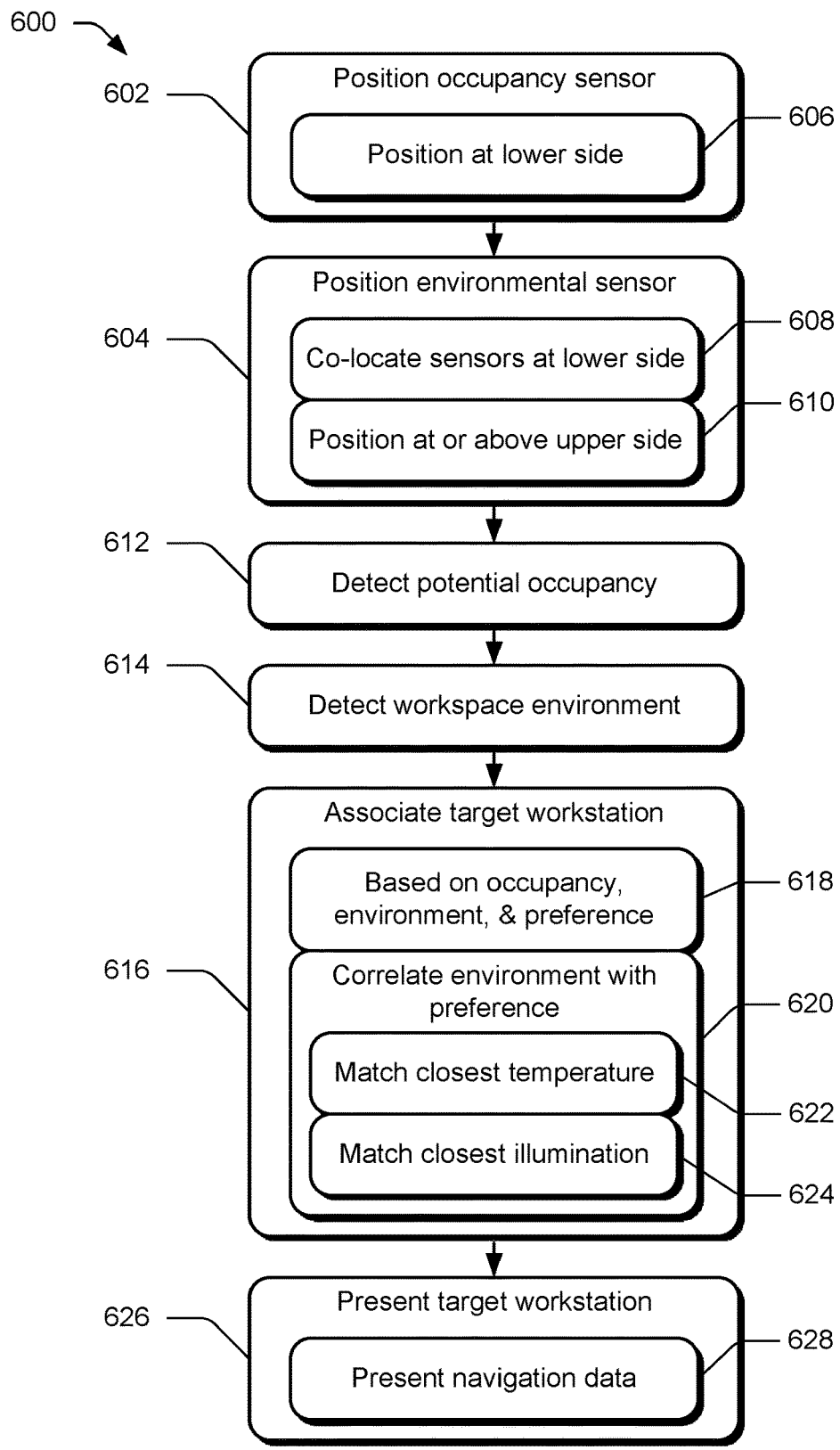
FIG. 6 is a flow diagram of a first operation of the flexible workspace system in an example implement that utilizes real-time feedback of presence and environmental sensors.

Referring to FIG. 6, there is shown a flow diagram of a first operation 600 of the flexible workspace system 102 in an example implement that utilizes real-time feedback of presence and environmental sensors 122-128. For example, some people may feel too hot or too cold within a facility 100, and temperature sensors at workstations may help guide people to workstations that are comfortable for them to use. For some embodiments, the system 102 utilizes IoT sensing technologies and data processing devices to detect workspace occupancy and workspace environmental conditions. The flexible workspace system 102 includes sensors 122-128 that monitor workspace environmental conditions, such as temperature, ambient light, humidity, noise, and the like. The system 102 may match users with a workspace that best meets their individual needs and preferences, in particular conditions which are dynamic across a facility and over time. Increased user comfort have a range of benefits, including increased productivity, higher employee retention, and improved office attendance in a hybrid remote work environment.

For a flexible workspace system 102 with real-time sensor feedback that includes multiple workstations within a predetermined area 102, a presence sensor is positioned (602) at each workstation 140 and an environmental sensor is positioned (604) at each workstation 140. Each workstation 140 includes a substantially horizontal surface having an upper side and the lower side. For some embodiments, the presence sensor of each workstation 140 may be positioned (606) at a lower side of the substantially horizontal surface of the corresponding workstation 140. For some embodiments, the environmental sensor may be positioned (608) co-located with the presence sensor of each workstation 140 at the lower side of the corresponding workstation 140. For some embodiments, the environmental sensor may be positioned (610) at or above the upper side of the corresponding workstation 140. Positioning (602, 604) of the occupancy sensor and the environmental sensor may occur at different times or within the same time period. Also, for some embodiments, the workspace environment may include temperature data, illumination data, or both associated with an environmental condition proximate the corresponding workstation 140.

Subsequent to positioning (602) the occupancy sensor or sensors and positioning (604) the environmental sensor or sensors, the system 102 detects (612) a potential occupancy proximate to the corresponding workstation 140 at the occupancy sensor(s) and detects (614) a workspace environment proximate the corresponding workstation 140 at the environmental sensor(s). Detection (612, 614) of the potential occupancy and the workspace environment may occur at different times or within the same time period.

In response to detecting the potential occupancy (612), the workspace environment (614), or both, the system 102 associates (616) a target workstation 140 of the multiple workstations with a mobile device 136 located within the predetermined area 102 based on the detected potential occupancy and/or the detected workspace environment. For example, the upstream device 130 may communicate with the presence sensors and the environmental sensors in order to associate the target workstation 140 with the mobile device 136. The flexible workspace system 102 may allow users to specify (618) their preferences for a range of attributes associated with a workspace they seek to reserve, matches (620) user preferences to real-time conditions across the available workspaces, and provides (626) users with available workspaces that best meet their individual needs. For some embodiments, the target workstation 140 may be associated (618) with the mobile device 136 based on the potential occupancy, the workspace environment, and a user preference associated with the mobile device 136. For some embodiments, the target workstation 140 may be associated with the mobile device 136 by correlating (620) the workspace environment of each workstation 140 of the multiple workstations with the user preference. For example, the workspace environment may be correlated with the user preference by matching (622) a closest environmental temperature of the multiple workstations to the user preference. For another example, the workspace environment may be correlated with the user preference by matching (624) a closest illumination condition of the multiple workstations to the user preference.

In response to associating (616) a target workstation 140 of the multiple workstations with a mobile device 136, the system 102 presents (626) the target workstation 140 at an output component of the mobile device 136. For some embodiments, navigation data may be presented (628) at the output component, such as a display of the mobile device 136, indicating a position of the mobile device 136 relative to a position of the target workstation 140. The mobile device 136 may include a positioning component to determine, in whole or in part, the position of the mobile device 136 within the predetermined area 102.

Figure 7:
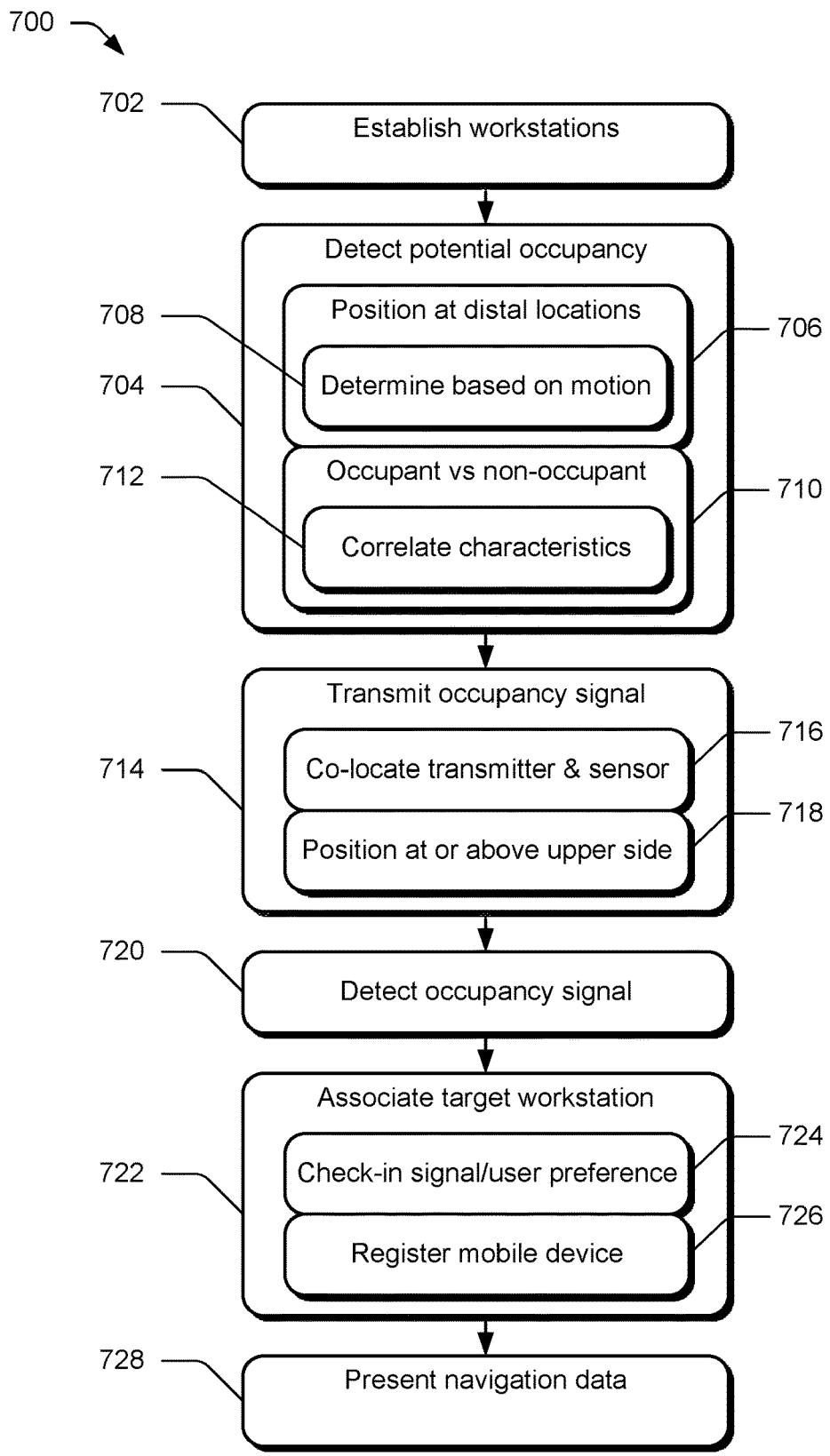

Referring to FIG. 7, there is shown a flow diagram of a second operation 700 of the flexible workspace system 102 in an example implement that utilizes real-time feedback of a presence sensor for mobile check-in. By integrating automated presence and/or occupancy detection into a flexible workspace solution, users may more easily check-in to a flexible workspace by simply being present at the reserved location. Occupancy errors (e.g., user forgets to manually check-in to space) are reduced or eliminated. Users may be identified depending on the technology used for occupancy detection (e.g., RF device linked to personal profile), providing a means of authenticating and then authorizing users who wish to use a flexible workspace. This approach may be used to automatically grant access to a reserved workspace should the physical capability exist to do so. Also, flexible workspaces may be used more efficiently by automatically freeing unused reservations based on direct observation of occupancy. Freeing spaces based on manual user check-in is error-prone (users can easily forget to check-in), causing scheduling conflicts and significant lost time spent finding a genuinely unoccupied meeting space.

For the second operation 700, the flexible workspace system 102 with real-time sensor feedback establishes (702) multiple workstations located within a predetermined area 102. Each workstation 140 established in the predetermined area 102 includes a substantially horizontal surface having an upper side and a lower side. Subsequent to establishing (702) the workstations, a presence sensor detects (704) a potential occupancy proximate an underside area below the lower side of the substantially horizontal surface. The presence sensor is positioned at the lower side of each workstation 140 to detect movement, temperature, and other changes to ambient conditions to determine potential occupancy of the workstation 140.

For some embodiments, the presence sensor detects (704) the potential occupancy by positioning (706) multiple motion sensors at distal locations at the lower side of each workstation 140. For example, the presence sensor may detect (704) the potential occupancy by determining (708) the potential occupancy based on motion signals detected at the motion sensors. For some embodiments, the presence sensor may detect (704) the potential occupancy by distinguishing (710) an occupant of a particular workstation 140 of the multiple workstations from a non-occupant of the particular workstation 140. For example, the presence sensor may distinguish the occupant from the non-occupant by determining (712) whether a signal characteristic detected by the presence sensor correlates with one or more predetermined characteristics of the occupant.

In response to detecting (704) the potential occupancy, a workstation transmitter transmits (714) an occupancy signal based on the potential occupancy detected by the presence sensor. The workstation transmitter is positioned at each workstation 140 and coupled to the presence sensor. For some embodiments, workstation transmitter transmits (714) the occupancy signal by co-locating (716) the workstation transmitter with the motion sensor of each workstation 140 at the lower side of the corresponding workstation 140. For some embodiments, workstation transmitter transmits (714) the occupancy signal by positioning (718) the workstation transmitter at or above the upper side of the corresponding workstation 140.

In response to the workstation transmitter transmitting (714) the occupancy signal, a mobile device 136 detects (720) the occupancy signal transmitted by the workstation transmitter and transmits a check-in signal based on the occupancy signal to the upstream device 130. The mobile device 136 is situated within the predetermined area 102. The check-in signal is transmitted to the upstream device 130 of the system 102.

In response to receiving the check-in signal from the mobile device 136, the upstream device 130 associates a target workstation 140 of the multiple workstations with the mobile device 136 based on the check-in signal. The upstream device 130 is in communication with the mobile device 136. For some embodiments, the upstream device 130 associates 722 the target workstation 140 with the mobile device 136 by associating (724) the target workstation 140 with the mobile device 136 based on the check-in signal and a user preference associated with the mobile device 136. For some embodiments, the upstream device 130 associates the target workstation 140 of the multiple workstations with the mobile device 136 by registering (726) the mobile device 136 based on the check-in signal at the upstream device 130. For example, the mobile device 136 may be registered by associating the target workstation 140 corresponding to the transmitted occupancy signal with the mobile device 136.

For some embodiments, the mobile device 136 may include a positioning component to determine, in whole or in part, the position of the mobile device 136 within the predetermined area 102. For mobile device 136s equipped with the positioning component, the mobile device 136 may present (728) navigation data at an output component of the mobile device 136 indicating a position of the mobile device 136 relative to a position of the target workstation 140. For example, the mobile device 136 may include a navigation application to present the navigation data at a display of the mobile device 136. The navigation data may include one or more indicators for the location of the target workstation 140 relative to the current location of the mobile device 136, traversing to the target workstation 140 from the current location, and/or a location of a person or object of interest relative to the current position.

Figure 8:
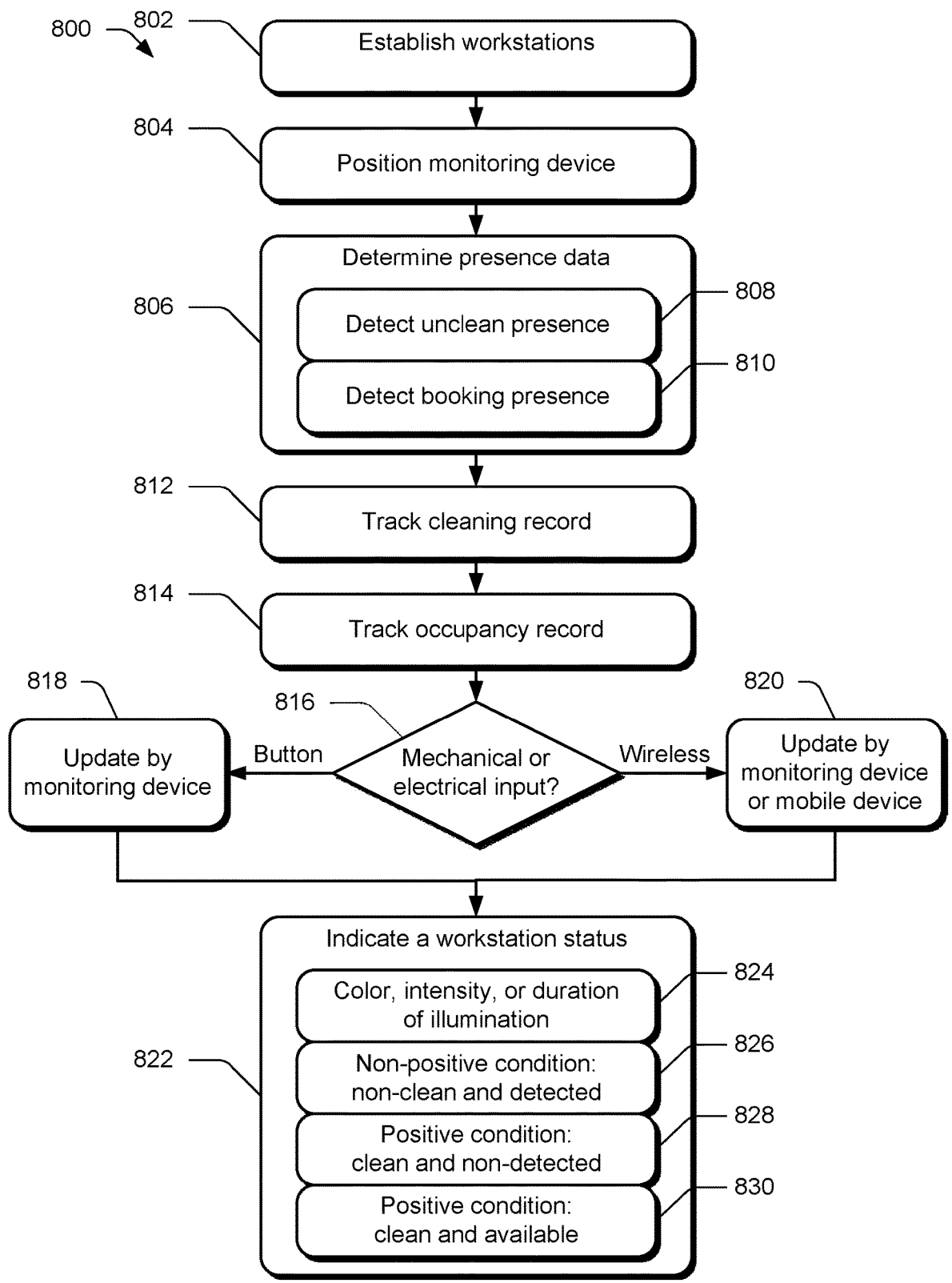
FIG. 8 is a flow diagram of a third operation of the flexible workspace system in an example implement that utilizes real-time feedback of a presence sensor for cleaning status.

Referring to FIG. 8, there is shown a flow diagram of a third operation 800 of the flexible workspace system 102 in an example implement that utilizes real-time feedback of a presence sensor for cleaning status. Deployment of occupancy detection technologies that may uniquely identify an individual user enable applications which track specific types of activities. For example, the system 102 can recognize cleaning staff that carry RF identification tags and automatically set the space to a "cleaned" state based on the presence of the tag in the space. This state information becomes another input to the flexible workspace solution, making a space available or unavailable depending on its cleaned state.

For the third operation 800, the flexible workspace system 102 with real-time sensor feedback establishes (802) multiple workstations within a predetermined area 102. Subsequent to establishing (802) the workstations, the system 102 positions (804) a monitoring device at each workstation 140 of the multiple workstations. Each monitoring device includes a presence sensor for the corresponding workstation 140 and an indicator for the corresponding workstation 140.

Subsequent to positioning (804) the monitoring device at each workstation 140, the system 102 determines (806) presence data of the workstations. The presence sensor of each monitoring device identifying a presence status of the corresponding workstation 140. For some embodiments, the system 102 determines (806) the presence data of the workstations by detecting (808) an unclean presence by a presence detector of the corresponding workstation 140. For some embodiments, the system 102 determines (806) the presence data of the workstations by detecting (810) a booking presence based on the occupancy record associated with the corresponding workstation 140.

In response to determining (806) the presence data, the upstream device 130 tracks (812) a cleaning record associated with maintenance of the workstations based on the presence data and tracks (814) an occupancy record associated with occupancy of the workstations.

Subsequent to tracking (812, 814) the cleaning record and the occupancy record by the upstream device 130, the monitoring device detects (816) a cleaning input. For some embodiments, each monitoring device includes a physical input component to receive a cleaning input. In response to receiving (816) the cleaning input at the physical input, the monitoring device updates (818) the indicator at the monitoring device and the cleaning record at the upstream device 130 based on the cleaning input. For some embodiments, a particular monitoring device receives a cleaning input via wireless communication from a mobile device 136 within the predetermined area 102. In response to receiving (816) the cleaning input from the mobile device 136, the monitoring device updates (820) the indicator at the monitoring device based on the cleaning input. In addition, the particular monitoring device, the mobile device 136, or both devices update (820) the cleaning record at the upstream device 130 based on the cleaning input.

In response to detecting (816) the cleaning input and/or updating the indicator and the cleaning record, the indicator of each monitoring device indicates (822) a workstation status based on the occupancy record and the cleaning record associated with the corresponding workstation 140. The workstation status includes an occupancy status based on the occupancy record associated with the corresponding workstation 140 and a cleaning status based on the cleaning record associated with the corresponding workstation 140. For some embodiments, each monitoring device indicates (822) the workstation status by indicating (824) the workstation status by at least one of type of color, intensity, or duration of illumination at the indicator. For some embodiments, each monitoring device indicates (822) the workstation status by indicating (826) a non-positive condition based on a non-clean status of the corresponding workstation 140 by the cleaning record and a detected status by the presence detector of the corresponding workstation 140. For some embodiments, each monitoring device indicates (822) the workstation status by indicating (828) a positive condition based on a clean status of the corresponding workstation 140 by the cleaning record and a non-detected status by the presence detector of the corresponding workstation 140. For some embodiments, each monitoring device indicates (822) the workstation status by indicating (830) a positive condition based on a clean status of the corresponding workstation 140 by the cleaning record and an available status by the occupancy record of the corresponding workstation 140.

Clean vs not clean workstations may be tracked for contact tracing purposes among others. For example, the system 120 may track whether people have occupied a workstation 140 and for how long. Indicators of sensors and monitoring devices 122-128 may, in some cases, include multiple light indicators (such as red, green, blue LEDs and/or blinking) to indicate a workstation status of free, booked, "cleaned", and the like. New occupants and cleaning personnel may become aware that one or more workstations can be occupied without regard to contamination by the last occupant. In addition, mobile devices 136 may be used by occupants and/or cleaning personnel to track "cleaning" status. For example, cleaning personnel may use QR code or other indicators at a workstation 140 to indicate to the upstream device 130 that a workstation has just been cleaned. For another example, the system 120 may track a tag (i.e., beaconing device) assigned to a cleaning person, detect that the tag exceeded at predetermined time at workstation, and indicate at the workstation and/or upstream device that workstation was cleaned. The system 120 may further alert other devices of the system about the cleaning status.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A flexible workspace system with real-time sensor feedback comprising:
    a plurality of workstations established within a predetermined area, each workstation of the plurality of workstations including a substantially horizontal surface having an upper side and a lower side, wherein the plurality of workstations include a desk;

a presence sensor positioned at the lower side of each workstation, the presence sensor detecting a potential occupancy proximate an underside area below the lower side;

a workstation transmitter positioned at each workstation and coupled to the presence sensor, the workstation transmitter transmitting an occupancy signal based on the potential occupancy detected by the presence sensor;

a mobile device situated within the predetermined area, the mobile device detecting the occupancy signal transmitted by the workstation transmitter and transmitting a check-in signal based on the occupancy signal, and an upstream device communicating with the mobile device, the upstream device associating a target workstation of the plurality of workstations with the mobile device based on the check-in signal.

2. The flexible workspace system as described in claim 1, wherein the presence sensor includes a plurality of motion sensors positioned at distal locations at the lower side of each workstation.

3. The workstation system as described in claim 2, wherein the presence sensor determines the potential occupancy based on motion signals detected at the plurality of motion sensors.

4. The flexible workspace system as described in claim 1, wherein the presence sensor distinguishes an occupant of a particular workstation of the plurality of workstations from a non-occupant of the particular workstation.

5. The flexible workspace system as described in claim 4, wherein the presence sensor determines whether a signal characteristic detected by the presence sensor correlates with one or more predetermined characteristics of the occupant.

6. The flexible workspace system as described in claim 1, wherein the workstation transmitter is co-located with the motion sensor of each workstation at the lower side of the corresponding workstation.

7. The flexible workspace system as described in claim 1, wherein the workstation transmitter is positioned at or above the upper side of the corresponding workstation.

8. The flexible workspace system as described in claim 1, wherein the upstream device associates the target workstation with the mobile device based on the check-in signal and a user preference associated with the mobile device.

9. The flexible workspace system as described in claim 1, wherein the upstream device registers the mobile device based on the check-in signal by associating the target workstation corresponding to the transmitted the occupancy signal with the mobile device.

10. The flexible workspace system as described in claim 1, wherein:

the mobile device includes a positioning component to determine, in whole or in part, the position of the mobile device within the predetermined area; and the mobile device presents navigation data at an output component of the mobile device indicating a position of the mobile device relative to a position of the target workstation.

11. A method of a flexible workspace system with real-time sensor feedback comprising:

establishing a plurality of workstations located within a predetermined area, each workstation of the plurality of workstations including a substantially horizontal surface having an upper side and a lower side, wherein the plurality of workstations include a desk;

detecting, at a presence sensor, a potential occupancy proximate an underside area below the lower side, the presence sensor being positioned at the lower side of each workstation;

transmitting, at a workstation transmitter, an occupancy signal based on the potential occupancy detected by the presence sensor, the workstation transmitter being positioned at each workstation and coupled to the presence sensor;

detecting, at a mobile device, the occupancy signal transmitted by the workstation transmitter and transmitting a check-in signal based on the occupancy signal, the mobile device being situated within the predetermined area; and associating, by an upstream device, a target workstation of the plurality of workstations with the mobile device based on the check-in signal, the upstream device communicating with the mobile device.

12. The method as described in claim 11, wherein detecting the potential occupancy includes positioning a plurality of motion sensors at distal locations at the lower side of each workstation.

13. The method as described in claim 12, wherein detecting the potential occupancy includes determining the potential occupancy based on motion signals detected at the plurality of motion sensors.

14. The method as described in claim 11, wherein detecting the potential occupancy includes distinguishing an occupant of a particular workstation of the plurality of workstations from a non-occupant of the particular workstation.

15. The method as described in claim 14, wherein distinguishing the occupant from the non-occupant includes determining whether a signal characteristic detected by the presence sensor correlates with one or more predetermined characteristics of the occupant.

16. The method as described in claim 11, wherein transmitting the occupancy signal includes co-locating the workstation transmitter with the motion sensor of each workstation at the lower side of the corresponding workstation.

17. The method as described in claim 11, wherein transmitting the occupancy signal includes positioning the workstation transmitter at or above the upper side of the corresponding workstation.

18. The method as described in claim 11, wherein associating the target workstation with the mobile device includes associating the target workstation with the mobile device based on the check-in signal and a user preference associated with the mobile device.

19. The method as described in claim 11, wherein associating the target workstation of the plurality of workstations with the mobile device includes registering the mobile device based on the check-in signal at the upstream device by associating the target workstation corresponding to the transmitted occupancy signal with the mobile device.

20. The method as described in claim 11, wherein the mobile device includes a positioning component to determine, in whole or in part, the position of the mobile device within the predetermined area, the method further comprising:

presenting, at the mobile device, navigation data at an output component of the mobile device indicating a position of the mobile device relative to a position of the target workstation.

* * * * *